No. 820,111. PATENTED MAY 8, 1906.
G. HERMANN.
ROUNDABOUT.
APPLICATION FILED NOV. 17, 1905.
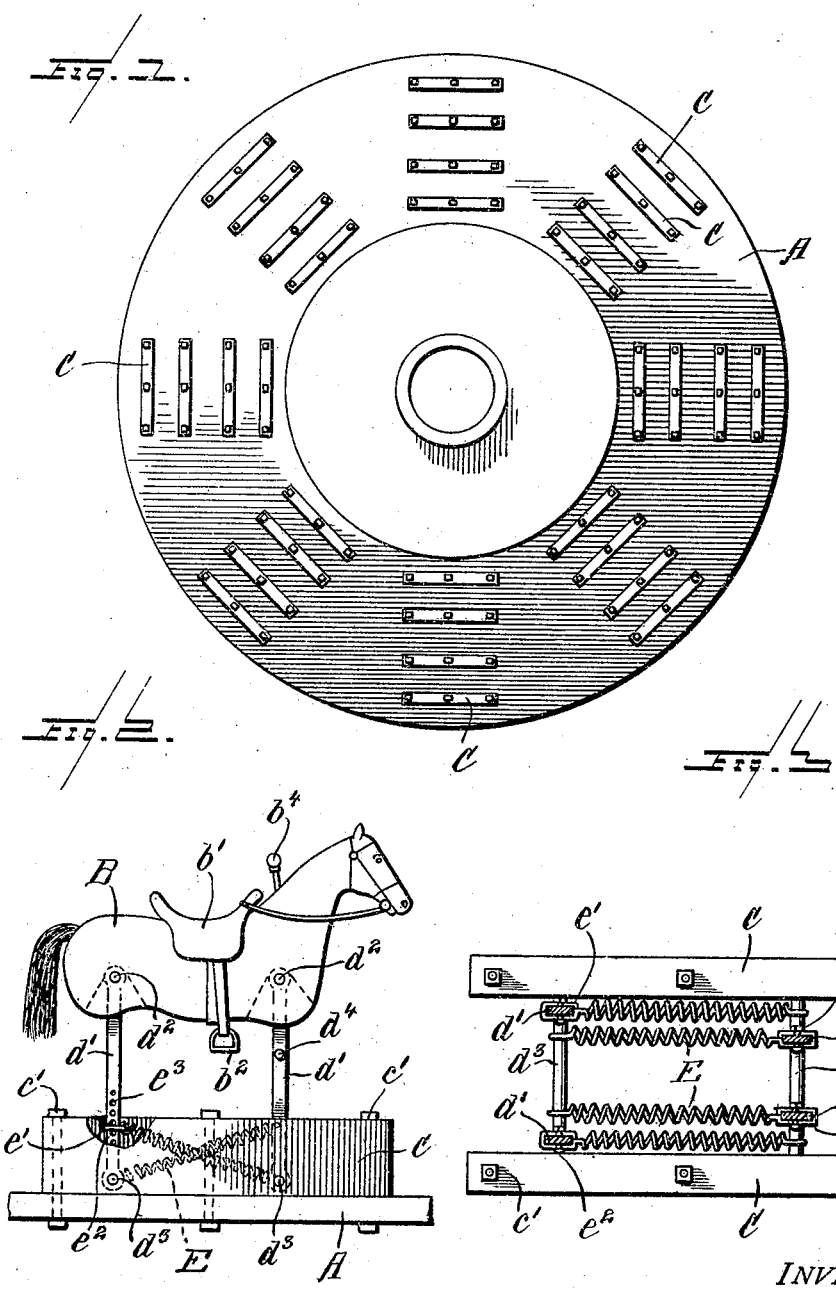

UNITED STATES PATENT OFFICE.

GEORGE HERMANN, OF CHICAGO, ILLINOIS.

ROUNDABOUT.

No. 820,111. Specification of Letters Patent. Patented May 8, 1906.

Application filed November 17, 1905. Serial No. 287,827.

*To all whom it may concern:*

Be it known that I, GEORGE HERMANN, a citizen of the United States, residing at Chicago, in the county of Cook and State of Illinois, have invented new and useful Improvements in Roundabouts, of which the following is a specification.

My invention relates to roundabouts, and especially to means for supporting and mounting the seats or representations of animals upon which the passengers are carried. The improvements consist in supporting the animal or other figures on legs and providing an arrangement of strong springs connected to the legs which enable the passenger to give the figure upon which he is mounted a to-and-fro movement auxiliary to the general circular motion caused by the rotation of the platform upon which the said figures are mounted.

In the drawings, Figure 1 is a plan view of a platform of a roundabout adapted to be equipped with a double row of animal figures, which, however, are not shown. Fig. 2 is a side view of one of the animal figures mounted upon its base. Fig. 3 is a plan view of the base and supports for the animals, showing the manner of attaching the springs.

Referring to the drawings, A is the revolving platform, and B the figures mounted thereon. Each figure is provided with a base consisting of two parallel beams C, strongly secured to the platform B by bolts $c'$, and two pair of supporting frames or legs composed of steel uprights $d'$, rigidly connected at each end by round cross-bars $d^2$ $d^3$. The upper ends of the uprights $d'$ are received in slots in the body of the figure, the ends of the cross-bar being journaled in bearings in the side of the body. Each end of the lower cross-bar $d^3$ is journaled in the base-beams C. The body of the animal is thus pivotally mounted upon the legs, which are held in vertical position by means of powerful springs E, one end of each spring being attached to the lower cross-bar $d^3$, the other end being attached to a hook $e'$, which clasps one of the opposite uprights $d'$, said hook being kept in position by means of bolts $e^2$. A series of bolt-holes $e^3$ are provided to allow adjustment. The springs are arranged in pairs, as clearly shown in Fig. 3, the uprights for each pair of supporting-legs being differently spaced laterally in order to allow the springs E to lie side by side without interference.

The animal figures are provided with deep saddles $b'$ to insure a safe seat for the passenger. Stirrups $b^2$ are used for foot-rests or for aids in mounting. The front legs of the animal have projections $d^4$ to be used as a foothold by the passenger in mounting to his seat, but which are especially designed as abutments against which the passenger pushes with his feet in order to set up a to-and-fro movement by the alternate expansion and contraction of the opposing pairs of springs. In order to afford still greater security to the rider, a T-shaped hold $b^4$ for the hand is fixed in the neck of the animal directly in front of the saddle.

The platform A is made of sufficient width to accommodate a number of animals side by side. Thus there may be two, three, or more circles of animal figures.

The device is intended to impart pleasant and unusual sensations by adding, in addition to the rotary motion, a to-and-fro movement of each animal at the will of the rider in a direction tangential to the general circular movement of the animals.

I claim—

1. In a device of the kind stated, the combination of a body, front and rear legs pivoted to the body, a base to which the lower ends of the legs are pivoted, springs supporting the legs, and projections extending sidewise from the front legs and arranged to receive the foot-pressure of a rider.

2. In a device of the kind stated, the combination of parallel base-beams, rock-shafts extending across between the beams, front and rear legs mounted on the shafts and carrying a body at the top, and crossed springs connected between the shafts and legs.

In testimony whereof I have signed my name to this specification in the presence of two subscribing witnesses.

GEORGE HERMANN.

Witnesses:
SIGNA FELTSKOG,
H. G. BATCHELOR.